UNITED STATES PATENT OFFICE.

JOHN L. KELLOGG AND BORIS KAZMANN, OF BATTLE CREEK, MICHIGAN, ASSIGNORS TO KELLOGG TOASTED CORN FLAKE CO., A CORPORATION OF MICHIGAN.

FOOD BEVERAGE AND PROCESS OF MAKING THE SAME.

1,348,999. Specification of Letters Patent. Patented Aug. 10, 1920.

No Drawing. Application filed March 31, 1917, Serial No. 158,961. Renewed June 27, 1919. Serial No. 307,249.

*To all whom it may concern:*

Be it known that we, JOHN L. KELLOGG and BORIS KAZMANN, citizens of the United States, residing at Battle Creek, county of Calhoun, and State of Michigan, have invented certain new and useful Improvements in Food Beverages and the Processes of Making the Same, of which the following is a specification.

This invention relates to a coffee substitute beverage and process for producing the same.

The beverage is preferably marketed in the form of dry soluble granules to which water can be added to produce an instant beverage, but it will be understood that the product can also be marketed in dry and roasted form, so that the consumer can produce therefrom, his own liquid extract by percolating.

The principal objects of the invention are to secure an improved flavor in the beverage, and to produce the product from starch-bearing materials without the necessary addition of sugar, molasses or other outside saccharine materials.

In carrying out the present process, it is intended to secure the resulting beverage wholly from starch-bearing material, treated in the manner hereinafter described. It is unnecessary to use any added saccharine matter such as molasses, raw sugars, granulated sugars, beet sugar, sorghum syrup, maple syrup, honey and the like. Among the starch-bearing materials which are suggested, are the legumes, nuts, tubers, starch-bearing roots, starch-bearing grains, starch bearing fruits, such as bananas; starch-bearing seeds, such as cotton-seed, St. John's bread, and algaroba beans; fat-bearing beans, such as soja beans, peanuts; grains; such as wheat, rye, barley, corn, Kafir corn and rice. We prefer, however, to employ as the starch-bearing starting materials, rye, wheat grains and wheat bran.

With these starting materials the process preferably is carried out in a series of steps as are hereinafter enumerated, but it is to be clearly understood that these steps may be altered in their order and some of them may be omitted, and various other changes in the means and manner of securing the final result may be resorted to within the scope of what is claimed, and as indicated by the variations in the different claims, without departing from the spirit of the invention.

*Step 1—Cleansing.*—The selected starch-bearing materials are first thoroughly cleansed in any suitable manner.

*Step 2—Grinding.*—The starch-bearing materials are milled, ground or granulated in any desirable way and in any suitable apparatus.

*Step 3—Blending.*—The different starting materials are suitably blended together according to the flavor desired. We prefer to use a blend composed of one-third wheat flour, one-third rye flour and one-third bran flour, or meal, broken and crushed, but as before stated this blend may be changed from time to time to suit the taste and in some cases a single starting material may be employed in place of blending.

*Step 4—Water-mixing.*—The selected flours are thoroughly mixed with water to produce suitable dough. We prefer to employ such an amount of water as will produce from thirty to sixty per cent. of moisture in the dough, but other amounts may be used if desired. We have found the ordinary baker's mixer to be suitable for producing the dough.

*Step 5—Loaving.*—The dough is preferably divided into loaves, either by hand or machine. We have found it convenient to employ loaves approximately twenty-four inches long, twelve inches wide and two inches thick.

*Step 6—Dextrinization.*—We prefer to dextrinize at least a part of the starch-contents of the mixture. The amount of dextrinization which we have found capable of producing a satisfactory beverage is that which results from subjecting the loaves to about fifteen pounds of steam pressure in a steam retort for a period of from two hours to two hours and fifty minutes, but the manner of producing the dextrinization and the pressure and the time of application when steam is employed may be varied within the scope of the claims. The method of dextrinization which we have employed with satisfactory results is as follows:

We place the loaves flat upon large steel trays which are supported one above the other and spaced from each other just sufficiently to prevent one tray from touching the loaves of a lower tray. These trays are placed in large steam retorts which are then closed so that live steam pressure may be directly applied to the loaves. As above stated, we prefer to use steam pressure of fifteen pounds, but a greater or lesser pressure can be employed according to the selected time of cooking. Fifteen pounds of steam pressure is approximately two hundred and fifty degrees "Fahrenheit", and at this temperature we prefer to steam the loaves from two hours to two hours and fifty minutes, according to the material used. Or the loaves may be baked in an oven.

*Step 7—Air-drying.*—The loaves are then removed from the retort and allowed to stand in an open room for about twentyfour hours to permit the evaporation of moisture by natural air-drying action. At the end of approximately twentyfour hours the loaves are found to be comparatively dry. They are not sticky and are very tough. The above is not necessary if the loaves are baked in an oven.

*Step 8—Pulverizing.*—The loaves are then pulverized, or broken up in a suitable manner. We prefer to feed into a pulverizing machine where they are ground into small particles varying from the size of a pin-head to that of a pea or bean.

*Step 9—Heat-drying.*—The broken particles are dried in any suitable form of heat drier until the granulated product contains approximately ten per cent. of moisture. Cold air drying may be employed if desired.

*Step 10—Sifting.*—The dried and broken particles preferably are sifted to separate the various sizes of particles into uniform groups so that each group can be roasted separately, as set forth in step eleven.

*Step 11—Roasting.*—The pulverized and dried material is roasted, preferably to a dark coffee brown color. This roasting may be effected in an ordinary coffee roaster, and as before stated, the different sizes are preferably roasted separately. Care should be taken to see that the product is not burned or charred, as a disagreeable taste will be thereby imparted to the final product.

*Step 12—Cooling.*—The roasted grains are preferably placed in any suitable form of cooler and cold air blown up through the grains until they are cool.

*Step 13—Percolation.*—The roasted grains are placed in ordinary percolators and boiling water is poured over same until the desired extract is obtained. We find that a good yield can be obtained by running the water successively through four or five percolators. The extract may of course be secured by boiling instead of by percolation. In that case it is boiled for about thirty minutes.

*Step 14—Vacuum-evaporation.*—The liquid extract thus obtained is preferably placed in an ordinary vacuum pan and evaporated down to any desired density. If the evaporated extract is to be dried in a rotary vacuum drier, the density of evaporation in the vacuum should not be greater than from seven to ten degrees B., in order to secure the best results. If vacuum shelf driers and pans are to be used in the final drying, the density of from twentytwo to twentyseven degrees B, is preferable.

*Step 15—Vacuum-drying.*—After vacuum-evaporating the product to the desired density, the liquid extract preferably is vacuum dried to produce the desired dry extract. Any suitable manner of vacuum drying may be employed. That is to say, we may employ either a rotary vacuum drier or vacuum shelf drier, or any desired and suitable manner of drying. We prefer to employ the shelf drier. The condensed liquid usually requires from two and one-half to three hours to pass into dried extract form in these driers. The action of the vacuum causes thin layers of extract to rise and form bubbles which finally dry in the form of a thick porous cake from two to two and one-half inches thick.

*Step 16—Granulation.*—The porous cake is scraped from the pans and comminuted in any suitable manner. By "comminuting" we not only mean breaking the product into tiny particles but also into flakes or scales. It is desirable that the scales or flakes should be as thin as possible so they can dissolve readily when coming in contact with boiling water.

The product of the present invention is produced in the manner described, without using sugar, maltose or other saccharine matter introduced to give flavor or taste to the final product. The beverage thus produced without any necessary additions to the original grains is readily soluble in hot water and serves in taste, appearance and volume as an agreeable substitute for coffee and other similar beverages.

The delicious flavor of the resulting product is apparently traceable to the wheat and rye, and its mineral matter is derived from the salts found in the grains and in the bran.

The action of the heat, moisture and pressure in dissolving and partially or wholly dextrinizing a certain proportion of the starch-granules of the grains and bran, also is probably instrumental in adding to the agreeable taste and color of the product.

The soluble carbohydrates formed by the action of heat and moisture on the starting materials are probably dextrins which by the roasting step are formed into a small amount of reducing sugars. The dextrins in the final product are easily assimilable in the digestive process. The product contains phosphate of potash which is useful in building bone and nerve cells.

We have thus succeeded in creating from starch-bearing materials, without necessary addition of saccharine or other extraneous matters, a product containing valuable mineral salts and carbohydrates, capable of affording nutrition to growing children, and working men, these ingredients being in a concentrated and palatable form, having an agreeable taste and capable of replacing caffein-bearing and other more or less harmful beverages.

What is claimed as new, is:

1. A food-beverage product consisting of a soluble extract of dextrinized and roasted starch-bearing material free from malt or saccharine material.

2. A food-beverage product consisting of a soluble extract of dextrinized starch-bearing material free from malt or saccharine material.

3. A food-beverage product consisting of a solid soluble extract of dextrinized starch-bearing material free from malt or saccharine material.

4. A food-beverage product consisting of a soluble extract of dextrinized and roasted starch-bearing material free from malt or saccharine material.

5. A food beverage product consisting of a soluble extract of partially dextrinized and roasted starch-bearing materials free from malt or saccharine material.

6. A food beverage product consisting of a soluble extract of blended and dextrinized starch-bearing materials free from malt or saccharine material.

7. A food beverage product consisting of a comminuted soluble extract of blended, dextrinized and roasted starch-bearing materials free from malt or saccharine material.

8. A food-beverage product consisting of a soluble extract of mixed, dextrinized, dried, granulated, roasted, percolated and concentrated starch-bearing materials free from malt or saccharine material.

9. A beverage-producing process which consists in securing the extract of dextrinized starch-bearing material free from malt or saccharine material.

10. A beverage-producing process which consists in securing the extract of a dextrinized and roasted starch-bearing material free from malt or saccharine material.

11. A beverage-producing process which consists in securing an extract of a dextrinized, roasted, percolated and concentrated starch-bearing material free from malt or saccharine material.

12. A beverage-producing process which consists in grinding a starch-bearing material free from malt or saccharine material, mixing the same with a liquid to produce a dough of suitable consistency, subjecting the dough to the action of heat, moisture and pressure, sufficient to dextrinize at least a part of the starch-bearing material, drying the mixture, pulverizing it, roasting it, cooling the roasted dough grains, securing a liquid extract therefrom, concentrating the liquid extract in any manner to dryness without burning, and comminuting the dried extract.

13. A beverage-producing process which consists in grinding and blending the starch-bearing materials free from malt or saccharine material, mixing the same with water, dextrinizing at least a part of the starch-contents of the mixture, and securing a liquid extract, therefrom.

14. A beverage-producing process which consists in grinding and blending starch-bearing materials free from malt or saccharine material, mixing the same with water, dextrinizing at least a part of the starch-contents of the mixture, securing a liquid extract, therefrom, concentrating the extract to dryness, and comminuting the dried extract.

15. A food-beverage product consisting of a soluble extract of solubilized and roasted starch-bearing material free from malt or saccharine material.

16. A food-beverage product consisting of a soluble extract of partly solubilized and roasted starch-bearing material free from malt or saccharine material.

17. A beverage-producing process which consists in subjecting a starch-bearing dough free from malt or saccharine material to a sufficient degree of heat to solubilize at least a portion of the starch-contents, roasting the product in granular form, and extracting the soluble contents.

18. A beverage-producing process which consists in subjecting a starch-bearing material free from malt or saccharine material to the action of sufficient heat and moisture to solubilize part of the starch-contents, roasting the product in granular form, and extracting the soluble contents of the roasted product.

19. A beverage product process which consists in mixing starch-bearing material free from malt and saccharine material with water to form a dough, in cooking said dough to partial dextrinization, in reducing the cooked dough to a powder, and roasting the powder.

20. A beverage product process, which consists in making a dough of starch-bearing material free from malt and saccharine material, in dextrinizing the starch contents of the loaves to about the extent which is produced by subjecting the dough to the heat, moisture and pressure of steam at about fifteen pounds for about two and one-half hours, in powdering the dextrinized dough and roasting the powder.

21. A beverage product consisting of a soluble extract of a roasted powder reduced from cooked and partially dextrinized dough of moistened, starch-bearing material free from malt or saccharine material.

22. A beverage product consisting of a soluble extract of a roasted powder reduced from a dough of moistened starch producing material free from malt or saccharine material, cooked and dextrinized to about the extent which is produced by subjecting the loaves to the heat, moisture and pressure of steam at about fifteen pounds for about two and one-half hours.

JOHN L. KELLOGG.
BORIS KAZMANN.